United States Patent [19]

Carlson

[11] 4,384,269
[45] May 17, 1983

[54] VEHICLE ACCELERATION/DECELERATION WARNING SYSTEM HAVING TURN SIGNAL FEATURES

[76] Inventor: Robert W. Carlson, 410 Getzville Rd., Amherst, N.Y. 14226

[21] Appl. No.: 244,884

[22] Filed: Mar. 18, 1981

Related U.S. Application Data

[63] Continuation-in-part of Ser. No. 103,410, Dec. 13, 1979, Pat. No. 4,258,353.

[51] Int. Cl.³ .............................................. B60Q 1/34
[52] U.S. Cl. ...................................... 340/67; 340/66; 340/72; 340/73; 340/81 R; 340/669; 200/61.27; 200/61.45 R
[58] Field of Search .................. 340/67, 71, 72, 52 H, 340/52 R, 52 F, 66, 69, 79, 81 R, 669, 73, 74, 55; 200/61.45 R, 61.45 M, 61.83, 61.27, 61.48, 61.52, 61.49; 250/200, 205

[56] References Cited

U.S. PATENT DOCUMENTS

3,914,737 10/1975 Sato ....................................... 340/73
4,105,996 8/1978 Shimizu ................................ 340/73

Primary Examiner—John W. Caldwell, Sr.
Assistant Examiner—Donnie L. Crosland
Attorney, Agent, or Firm—Christel, Bean & Linihan

[57] ABSTRACT

An electronic acceleration/deceleration warning system for a vehicle includes an electro mechanical transducer, for example an arrangement of pendulum, light source and photocells, for converting acceleration or deceleration of the vehicle into an electrical quantity, changing in proportion with the rate of deceleration, an oscillator having a variable frequency output, a circuit connected to the transducer and oscillator for varying the frequency of the oscillator output signal in proportion to the vehicle deceleration, and a pair of warning lamps horizontally displaced on the rear end of the vehicle and connected to the oscillator in a manner such that the lamps flash alternately and at a rate determined by the vehicle deceleration. The warning lamps can also serve as turn indicators for the vehicle. A manually-operated switch has two selectable states corresponding to the two turn directions for the vehicle. A circuit connected to the switch, oscillator and lamps applies a constant frequency signal to either one of the lamps and prevents application of the signal to the other lamp as determined by the manually selected state of the switch. A priority arrangement operative in response to a predetermined level of deceleration prevents disabling of either warning lamp thereby allowing operation of the warning system irregardless of the state or position of the turn selector switch.

8 Claims, 3 Drawing Figures

VEHICLE ACCELERATION/DECELERATION WARNING SYSTEM HAVING TURN SIGNAL FEATURES

CROSS REFERENCE TO A RELATED APPLICATION

This application is a continuation-in-part of my pending application Ser. No. 103,410 filed Dec. 13, 1979 and entitled "Vehicle Acceleration/Deceleration Warning System" now U.S. Pat. No. 4,258,353 issued Mar. 24, 1981.

BACKGROUND OF THE INVENTION

This invention relates to the art of vehicle deceleration and acceleration warning systems, and more particularly to a new and improved vehicle acceleration/deceleration warning system wherein the visual indicators thereof also serve as turn signals for the vehicle.

In my pending United States patent application Ser. No. 103,410 filed Dec. 13, 1979 entitled Vehicle Acceleration/Deceleration Warning System there is shown and described an electronic acceleration and deceleration warning system for a vehicle wherein a pair of warning lights displaced horizontally on the rear of the vehicle are alternately flashed at a rate dependent on the rate of deceleration of the vehicle. It would be highly desirable to provide a system wherein the same indicators of the warning system can be used to provide turn signals for the vehicle. In providing such a system, an important consideration for safety and other reasons is to incorporate a priority scheme for the warning system at predetermined levels of deceleration.

SUMMARY OF THE INVENTION

It is, therefore, a primary object of this invention to provide a new and improved vehicle acceleration/deceleration warning system.

It is a more particular object of this invention to provide such a warning system wherein the visual indicators thereof also serve as turn signals for the vehicle.

It is a further object of this invention to provide such a warning system including a priority of the warning system over the turn signals at predetermined levels of deceleration.

It is a further object of this invention to provide such a system for adaptation of turn signals to vehicle acceleration/deceleration warning which is simple in construction and reliable in operation.

The present invention provides a vehicle acceleration/deceleration warning system wherein the visual indicators thereof also serve as turn signals for the vehicle and wherein the warning system has priority over the turn signals at predetermined levels of deceleration. The warning system comprises a electromechanical transducer for converting deceleration of the vehicle into an electrical quantity which changes in proportion to vehicle rate of deceleration, an oscillator having a variable frequency output signal, means operatively connected to the transducer and the oscillator for varying the frequency of the oscillator output signal as determined by vehicle rate of deceleration, a pair of visual warning lamps in spaced, generally horizontal relation on at least the rear end of the vehicle, and a circuit connecting the lamps to the oscillator in a manner such that the lamps flash alternately and at a rate proportional to the rate of deceleration of the vehicle. A manually operated switch has two selectable states corresponding to the two turn directions for the vehicle. Circuit means connected to the switch, warning lamps, and oscillator serves to apply a constant frequency oscillator output signal to the warning lamp corresponding to the direction of vehicle turn as indicated by manual operation of the switch while simultaneously preventing application of the oscillator output signal to the other lamp. A priority determining means operatively connected to the transducer and to the circuit means operates in response to a predetermined level of deceleration signalled by the transducer means to prevent disabling of either warning lamp during vehicle turning to allow the warning system to operate irregardless of the state of the turn selector switch.

The foregoing advantages and characterizing features of the present invention will become clearly apparent upon a reading of the ensuing detailed description together with the included drawing wherein:

DETAILED DESCRIPTION OF THE ILLUSTRATED EMBODIMENT

Figure 1:
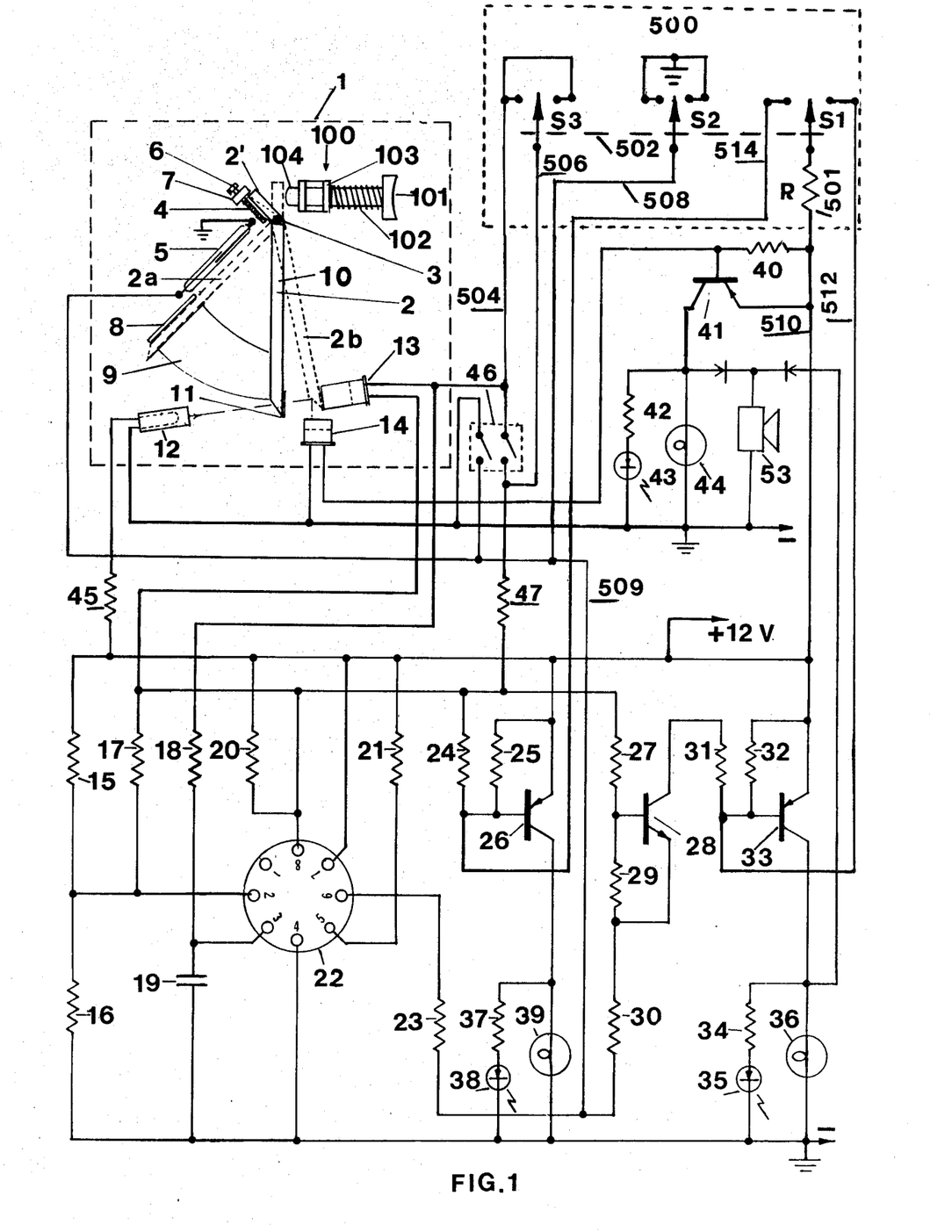
FIG. 1 is a schematic diagram of a vehicle acceleration deceleration warning system wherein the visual indicators thereof also serve as turn indicators for the vehicle according to the present invention.

Referring to FIG. 1 there is shown a vehicle acceleration-deceleration warning system including an electromechanical transducer, generally designated 1, for converting deceleration of the vehicle into an electrical quantity which changes in proportion to vehicle rate of deceleration. The transducer comprises a pendulum 2 pivotally mounted on a threaded support rod 4 fixed at one end to a mounting base (not shown) in the vehicle and provided with nuts 3. Thus, threaded rod 4 is the pivotal suspension support for the pendulum 2. Rod 4, as well as nuts 3 on each side of the pendulum 2, are composed of a magnetic material, thus providing part of magnetic damping for the pendulum and part of a magnetic path (which also includes screw 6) to reed switch 5. Screw 6, of magnetic material, is for adjustment of the coupling of the magnetic field of the magnets 10 within pendulum 2 to thereby set the closing or deceleration threshold of reed switch 5. Closing of reed switch 5 completes the ground to the oscillator and inverter-driver thus allowing the entire system to function. The oscillator frequency varies from approximately 0.5 to 5. Hz. in proportion to the amount of illumination of photocell 13, for deceleration levels greater than the deceleration threshold level. By using screw 6, the tolerances of reed switch 5 and the pendulum magnet(s) 10 may be loose, as much as ±30%. This adjustment primarily allows for manufacturing economy. Angular displacement of pendulum 2 (left-ward as seen in FIG. 1) actuates the closing of reed switch 5 by the magnet(s) 10 which are disposed within pendulum 2. Mechanical stop plate 8 is displaced at a left-ward angular displacement of 45° from the vertical position of pendulum 2. Stop 8 is made of a high permeability soft magnetic material, and when the pendulum reaches an angular displacement of over 30° (representing a deceleration of 16.1 feet per second, per second or 0.5 "g"), the magnet(s) 10 located in pendulum 2 pull the pendulum to the stop 8 and hold it in this position until it is released by a manual reset push-button assembly 100. With the pendulum held against stop 8, reed switch 5 is held closed with an even greater magnetic force to thereby prevent any mechanical shock experienced by the automobile from opening the contacts. Damping plate 9 is a flat strip of magnetic material, with high permeability and low retentivity, for providing mechanical damping to pendulum 2 which pivots in close proximity to damping plate 9. This is due to the magnetic field created by the permanent magnet(s) 10 located within pendulum 2.

As shown in FIG. 1, the damping action is increased as the left-ward angular displacement of pendulum 2 increases. A small magnetic path also is provided by damping plate 9 for activating reed switch 5. The left end of damping plate 9 is physically separated from stop 8, thus allowing the magnetic force to be increased slightly when the pendulum is held at stop member 8. Push-button assembly 100 includes button 101 attached to plastic rod 104 and inserted into a plastic or non-magnetic bracket 103. A spring 102 urges plastic rod 104 to a retracted position (to the right in FIG. 1), such that a canted extension 2' of pendulum 2 almost engages rod 104 when the pendulum 2 is held against stop 8 as indicated by the phantom line position 2a of FIG. 1. By depressing button 101, plastic rod 104 is urged into contact with extension 2' of pendulum to disengage pendulum 2 from stop 8; spring 102 returns rod 104 to the position of FIG. 1.

Located at the bottom end of pendulum 2 is a flat plate or section 11 surfaced at the proper angle of 42°. The outer surface of plate 11 is reflective to a light source 12 (7° below horizontal) and is dimensioned and positioned to reflect the light from light source 12 in a manner to be described. Light sources 12 may be an LED which emits a red beam of light. Any radiant source of energy could be used with compatible light sensors. In this embodiment, photocells 13 and 14 are arranged as shown in FIG. 1. The electrical resistances of these photocells 13 and 14 is high when they are not illuminated, and the resistance value of each is decreased with an increase of illumination up to a saturation point. The illumination of photocell 13 varies as the left-ward angular displacement of pendulum 2 varies from approximately 8° to 22½° (the 8° arbitrary value is the deceleration threshold). Left-ward angular displacement of pendulum 2 occurs during deceleration, with right-ward angular displacement of pendulum 2 occuring during acceleration. The amount of angular displacement is proportional to the amount of deceleration. Photocell 14 is for sensing a fixed threshold value of acceleration. Photocell 14 is fully illuminated after a small right-ward angular displacement of the pendulum and will remain fully illuminated as long as the acceleration is a minimum value equivalent to an arbitrary 8° of right-ward angular displacement of pendulum 2. This arbitrary 8° pendulum swing represents an initial value of acceleration of approximately 4.5 feet per second, per second.

The pendulum 2 employed in the warning system is quite small, 42 millimeters (mm) or approximately 1.7 inches, in length from the pivot point to the bottom end. This pendulum is not required to do any mechanical work except to move in accordance with changes in vehicle velocity. Prototype pendulums have been fabricated from small rigid tubes or channel sections of brass in the order of 4 mm square. Two permanent magnets are placed, with poles aiding, within the channel sections. These magnets are approximately 0.125 inches square and 0.755 inches long, thus allowing a snug fit into the pendulum section, and are fastened permanently into the section. Each magnet weighs approximately 1.5 grams, or a total of 3 grams for the pair of magnets, with the entire assembled pendulum weighing a total of 4 grams. The greatest mass obviously is in the magnets, the weight being distributed over the entire length of the pendulum, and the center of gravity of the completed pendulum is approximately 20 mm below the point of suspension. The completed pendulum unit, being light of weight, is quite easy to handle mechanically from the standpoint of suspension of the mass during deceleration or acceleration and other shocks during vehicle operation.

The means of suspension of pendulum 2 is rather simple and novel. It makes use of a common machine screw 4 as the fixed suspension point, and two like-sized nuts 3 are threaded onto the screw on either side of the pendulum. The pendulum then swings on the threads of the screw. A dry lubricant on these threads allows a very free swinging pendulum and provides an exceptionally free, smooth suspension system, with built-in side restraint being offered by the spaced nuts threaded on either side. This suspension feature is also useful and economical in assembling the unit, since it can be adjusted toward or away from a back mounting plate by the nut and screw arrangement. The threaded screw pivot works well as a bearing for the pendulum and provides lateral stability, all in an economical way and with easy assembly and adjustment. This pendulum and associated support base, in production quantities, permits injection molding techniques in which the threaded portion could be molded to the pendulum. Molding materials offering excellent strength and low friction characteristics are readily available.

The magnets contained within the pendulum section perform three functions. In order of use, these functions are: (1) to provide damping on pendulum movement by exerting a magneto-motive force (mmf) between the pendulum and the shaped, soft steel, thin plate 9 mounted on the back support and parallel to the plane in which the pendulum swings; (2) to close the reed relay switch 5 (which sets the threshold for the low deceleration value) at a predetermined number of degrees from vertical; and (3) to lock the pendulum 2 to a stop when it has exceeded the high limit of decleration, as might occur in an emergency stop or crash. This allows warning indicators to continue in operation until the vehicle is in a safe position and the manual reset button 101 is actuated. The reset push button 101 operates against a canted section of the pendulum 2, extending upward from the suspension point at an angle of 45° and allows release of the pendulum after deceleration has been high enough in value to swing the pendulum an angle of 45° into contact with a stop plate. The opposite end (bottom) of the pendulum is also functional, having a reflective surface at an angle to the pendulum section for reflection of light from a light source onto a photocell when a predetermined amount of acceleration has taken place.

A mounting base of molded plastic or the like may be provided for various ones of the parts, and in particular the push button bracket 103, nut 7, threaded support rod 4, reed switch 5, stop plate 8, damping plate 9, light source 12 and photocells 13 and 14 would be mounted in fixed position on such base. This provides a small size, light weight package thereby allowing ease of mounting to a dash board and requiring a small amount of space. A reset push button and small warning lights (corresponding to the warning lights on the outside of the vehicle) are mounted on the front panel of the unit within easy access and view of the operator of the vehicle.

The warning system of FIG. 1 further comprises an oscillator having a variable frequency output signal and means operatively connected to the transducer and the oscillator for varying the frequency of the oscillator output signal as determined by the rate of deceleration of the vehicle. Integrated circuit (IC) 22 contains a variable oscillator and subsequent driver; this is an integrated circuit used commonly in the industry and classified as CA3094. IC 22 is a programmable amplifier consisting of a pair of operational amplifiers coupled to an internal Darlington coupled power transistor capable of supplying a driving current of up to 100 milliamps. FIG. 1 discloses a top view of the pin connections of IC 22. Pins 2 and 3 are the inputs to the operational amplifiers. Pin 8 is the collector output of the power amplifier (resistor 20 is the load resistor connected between pin 8 and B+) and drives subsequent transistors 26 and 28, the output of pin 8 being a square wave. Pin 6 of IC 22 is the emitter of the driver and is returned to ground through resistor 23 when reed switch 5 is closed or when double-pole, single-throw switch 46 is closed. Resistor 23 removes the ground return for the amplifier when the pendulum 2 is in a vertical, i.e. rest position, and resistor 30 removes the inverter ground return when switches 5 or 46 are open. Resistor 45 is a current limiting resistor for light source 12. Resistors 15,16 and 17 fix the bias of one of the internal amplifiers of IC 22, with resistor 17 selected to adjust the symmetry of the square wave oscillator output. Resistor 18, in series with the variable resistance of photocell 13, forms the RC time constant for the oscillator in conjunction with capacitor 19. Resistor 21, connected between pin 5 of IC 22 and B+, controls the gain of the differential amplifiers, and is selected to make the input impedance of the differential amplifiers high.

The warning system of FIG. 1 further comprises a pair of visual indicator lamps 36,39 in spaced, generally horizontal relation on at least the rear end of the vehicle and a circuit connecting the lamps to the oscillator in a manner such that the lamps flash alternately and at a rate proportional to the rate of deceleration of the vehicle. Transistors 26 and 33 are PNP power transistors for driving the respective warning lights 39,36 which are of the type generally used as vehicle rear indicators. A medium power NPN transistor 28 operates as a phase inverter such that transistor 33 is "on" when transistor 26 is "off", and vice versa, according to the square wave frequency. For respective transistors 26,28, and 33, resistors 25,29 and 32 are base-emitter biasing resistors, and resistors 24,27 and 31 are drive/isolation resistors. Resistor 47 is shunted across photocell 13 when manual switch 46 is closed or the turn signal is turned on as will be explained. The value of resistor 27 is selected to give an oscillator frequency of approximately one half cycle per second or less. Thus upon closing switch 46 or actuating the turn signals the indicator lamps 39 and 36 will alternately flash at the repition rate of approximately one cycle per second. The emergency parking light arrangement is much like that normally provided on automobiles, except that the warning lights of the instant invention are flashed alternately. A PNP-type power transistor 41 is biased on when the minimum threshold of acceleration has been reached, such that maximum illumination reaches photocell 14 to lower the resistance value thereof. The resistance value of photocell 14, together with resistor 40, forms a voltage divider network to establish biasing voltage of transistor 41. Transistor 41 is used to drive acceleration indicator 44 which may be located on the exterior of the vehicle. Audio generator 53 is driven by transistor 41 to provide a constant tone during acceleration, and transistor 33 drives audio generator 53 during deceleration to provide an interrupted tone. Shunted across indicators 39,36 and 44 are respective tell-tale lights (such as LEDs) 38, 35 and 43 located within view of the operator of the vehicle.

In operation, the forward direction of travel of the vehicle is assumed to be to the left as viewed in FIG. 1. The tip of pendulum 2 describes an arc as shown, and pendulum 2 is limited in right-ward angular displacement by abutment with photocell 13 and in left-ward displacement by stop plate 8. In the acceleration mode, the major axis of pendulum 2 crosses the 8 degree mark on the arc when the pendulum has been displaced by 10 degrees right-ward, at which time pendulum 2 abutts photocell 13. This 10 degree swing of pendulum 2 provides maximum illumination of photocell 14 by the reflected light from light source 12. Maximum illumination of photocell 14 is the threshold value of acceleration warning. Of course, any greater acceleration causing pendulum 2 to continue to abut photocell 13, continues to give maximum illumination to photocell 14. In the deceleration mode, the trailing edge of pendulum 2 is defining the aperture. Increased deceleration of the vehicle causes increased left-ward displacement of pendulum 2 thus allowing more light from source 12 to impinge upon photocell 13. This variation in the amount of light reaching photocell 13 ranges from no light reaching photocell 13 for any right-ward swing of pendulum 2 from vertical, to maximum illumination of photocell 13 during any leftward angular displacement of pendulum 2 which is greater than approximately 22.5 degrees. Therefore, the height of a light aperture is defined by a perpendicular from the point on the arc at which the pendulum tip is located. The height of the aperture is a direct function of the displacement angle described by pendulum 2 as it travels left-ward as viewed in FIG. 1 from its vertical or rest position which angle, in turn, is a function of the linear deceleration of the vehicle.

Accordingly, the amount of light impinging upon photocell 13 from light source 12 varies the resistance of photocell 13 to thus influence the frequency of the oscillator circuit and vary the rate of flashing of alternate deceleration warning signals 39,36. In the acceleration mode, no acceleration indication is given until the pendulum has been displaced right-ward by an amount of 10° to a stop.

FIG. 1 shows the radiant energy beam displaced from the horizontal, for example about 7 degrees. With this displacement the aperture height of the beam below the pendulum tip is measured along a line perpendicular to the beam, and the aperture increases with the displacement angle of the pendulum. The aperture formed by this arrangement is larger than an aperture formed if the radiant energy beam were in a horizontal plane, especially at small angles of displacement. The 7 degree angle was selected as a result of the following arbitrary limits and the selection of electronic components. The low limit or threshold of deceleration which will activate the warning lights was chosen for a displacement angle of 8 degrees or a g value of 0.14 g. The maximum flash rate is reached when the pendulum displacement reaches an angle of 22½ degrees in the forward direction or at a value of approximately 0.4 g. Unrestrained objects in a vehicle, including the occupants on seats, will start to slide or move forward with a deceleration level of 0.5 gs. So to insure more safety, the high limit of deceleration was set at 0.4 gs to be below the 0.5 g level. These arbitrary limits resulted in an aperture height determined at the 8 degree displacement position which was too small to properly activate sensor 13. Displacing the energy beam by 7 degrees provide an aperture of acceptable size. The 7 degree angle dictates that the reflective surface at the tip of the pendulum is set at 42 degrees with respect to the axis of the pendulum. This provides maximum illumination on sensor 14 when the sensitive surface of the sensor is parallel to the horizontal and the pendulum is in the extreme right position representing the threshold of the acceleration mode.

In accordance with the present invention the indicator lamps 36,39 of the warning system also serve as turn signals for the vehicle, and there also is provided a priority arrangement whereby the vehicle warning system has priority over the turn signals at a predetermined level of deceleration. A vehicle turn selector switch is provided in the form of a manually operated switch generally designated 500 in FIG. 1 having two selectable states corresponding to the left and right turn directions for the vehicle. The manually-operated part (not shown) of switch 500 is located for convenient access in the vehicle, typically on the steering column according to the conventional practice. In preferred form, switch 500 is a three pole, double throw switch center neutral wherein the three poles are designated S1, S2 and S3 in FIG. 1, each pole including a switch arm movable between a pair of contacts. Switch 500 is shown in a neutral state wherein no turning is indicated, and simultaneous movement of the joined switch arms indicated by line 502 to the left or right as viewed in FIG. 1 to engage corresponding switch contacts results in signalling of a turn in either of the two directions in a manner which will be described.

There is also provided circuit means which functions, briefly, to make use of the warning system circuitry used to generate the flashing signal provided by lamps 36,39 and which inhibits one of the lamps while allowing the opposite lamp to flash, the opposite lamp corresponding to the turn direction selected by switch 500. In particular, the circuit means is connected to switch 500, to the warning lamps 36,39 and to the output of the oscillator. This circuit includes means for applying a substantially constant frequency signal from the oscillator to one of the warning lamps and means for preventing application of the oscillator signal to the other warning lamp when the switch 500 is in one state, and the circuit further includes means for applying a substantially constant frequency signal from the oscillator to the other warning lamp and means for preventing application of the oscillator signal to the first lamp when the switch is in the other state. As shown in FIG. 1, the center switch pole designated S2 is a neutral pole having the contacts thereof connected to electrical ground. Both contacts of switch pole S3 are connected by a line 504 and hence to resistor 18 of the oscillator circuit. The switch arm of pole S3 is connected by a line 506 to one terminal of the resistor 47 which is employed in the warning system circuit when both lights are operated to serve as emergency blinkers. Resistor 47 in series with resistor 18 then serves as a frequency determining resistance means connected between the arm of the switch pole S3 and the oscillator for causing the oscillator to provide a substantially constant frequency output signal. The arm of the neutral switch pole S2 is connected by lines 508 and 509 to resistors 28 and 30 to provide an electrical ground which is required for the functioning of the electronic circuit. The arm of switch pole S1 is connected to resistor 501 which, in turn, is connected by line 510 to the positive voltage as a bias source to disable either of the lamp drivers by preventing the application of the oscillator frequency signal to either transistor 33 or 36 and prevent the lamps in either circuit from operating. The switch contacts of pole S1 are connected by lines 512 and 514, respectively, to corresponding power circuits or drivers of the warning lamps 36,39, respectively. As a result, when the arm of switch pole S1 engages one of the contacts, the warning lamp having a B+ bias circuit connected to that contact is rendered inoperative and the substantially constant frequency output signal from the oscillator is applied to the other warning lamp. In the present illustration this is accomplished by application of the relatively high positive bias voltage to the base terminals of the corresponding driver transistor 33 and 26 in the circuits for the lamps 36 and 39, respectively.

In operation, the system thus provides turn signals, using the same rear vehicle warning lamps and the oscillator with associated components. Section S1 of switch 500 is used to disable or prevent one of the two lamps from being illuminated, while the opposite lamp is allowed to flash at a low rate of frequency supplied by the oscillator. The switch 500 disables the lamp opposite to the direction of turn selected by the switch. In order to disable the lamp easily, the fixed high plus bias voltage is applied to the base of the transistor driving the lamp that is not to be illuminated. The opposite transistor driver operating at the normal bias is driven by the oscillator signal and will flash at a low rate. Section S2 of switch 500 duplicates the function of the reed relay 5 in FIG. 1 and performs the grounding of the electronic circuit to make the circuit operational. Section S3 of switch 500 places a fixed value resistor in the oscillator circuit to provide a low frequency oscillation, for example 1 cycle or less per second.

While the foregoing system has been described for use with the two lamps 36,39 located in horizontally spaced relation on the rear end of the vehicle, it also can be used to operate two additional lamps in horizontally spaced relation on the front end of the vehicle also serving as turn indicators, as presently in common use on vehicles.

From the foregoing it is shown that the warning system can be used to provide flashing turn signal lamps by the addition of a three-pole, double throw switch with a neutral center. However, the warning system would be prevented from functioning properly with one lamp being disabled. Therefore, in accordance with the present invention, there also is provided a priority determining means operatively connected to the transducer 1 and to the circuit means associated with switch 500 which operates in response to a predetermined level of deceleration signalled by transducer 1 to prevent disabling of either warning lamp 36 or 39 during vehicle turning to allow the warning system to operate irregardless of the state of the turn selector switch 500. Accordingly, the priority system precludes operation of the turn selector switch 500 and associated circuit means and thus enables both indicator lamps 36,39 and allows the warning system to work over the normal range of deceleration it was originally intended for. Briefly, the priority system operates by interrupting or removing the inhibiting bias voltage applied to the lamp power circuits or drivers by the circuit means associated with switch 500 whenever pendulum 2 reaches the present displacement angle and closes reed switch 5 to establish the warning signal generated by the system.

Figure 2:
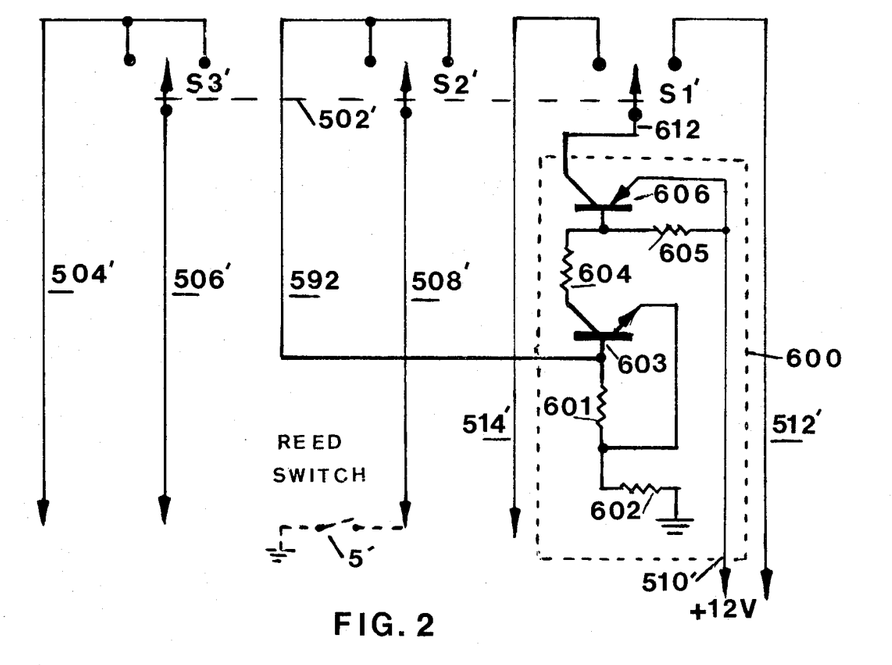
FIG. 2 is a schematic diagram of a circuit according to the present invention for providing a priority for the warning system over the turn signals at predetermined levels of rate of deceleration in the system of FIG. 1.

Referring now to FIG. 2 there is shown a priority system for use in the system of FIG. 1. For convenience in illustration, like components are identified by the same reference numerals with a prime designation. Thus the three poles or sections of the manually operated turn selector switch are designated S1', S2' and S3' and the mechanical connection of the three switch arms is indicated by the broken line 502. Both contacts of switch pole S3' are connected by line 504' to resistor 18 in the oscillator circuit and the switch arm of pole S3' is connected by line 506' to resistor 47 as in the embodiment of FIG. 1. The switch arm of pole S2' is connected by a line 508' to resistors 23 and 30 and hence to the reed switch designated 5' in FIG. 2. Thus closing of reed switch 5' in response to a predetermined level of deceleration changes the potential to reference or ground level potential on the switch arm of pole S2', and this change to a ground potential signalling a predetermined level of deceleration is utilized by the system in a manner which will be described.

The switch contacts of pole S2' are connected by a line 592 to a voltage controlled switching means generally designated 600 in FIG. 2. In particular, line 592 is connected to one side of a voltage divider comprising the series combination of resistors 601 and 602, the other side of which is connected to ground. Line 592 also is connected to the base terminal of an NPN transistor 603, the emitter terminal of which is connected to the junction of resistors 601,602. The collector terminal of transistor 603 is connected to one side of a voltage divider comprising the series combination of resistor 604 and 605. The junction of resistors 604,605 is connected to the base terminal of PNP transistor 606, the emitter terminal of which is connected to the other side of the voltage divider and to the +B voltage. The collector terminal of transistor 606 is connected to the switch arm of pole S1'. The junction of the emitter terminal of transistor 606 and resistor 605 is connected line 510' leading to the source of positive bias voltage in the system of FIG. 1. The switch contacts of pole S1 are connected by lines 512' and 514', respectively, to corresponding power or driver circuits of the warning lamps 36 and 39, respectively.

In operation, pole S2' of the switch returns the electronics to ground through the series-connected pair of resistors 601,602 whenever reed switch 5' is open. These resistors are low value and due to the current flow through them, produce approximately two volts. The two resistors 601 and 602 also form a part of the base emitter requirements for the NPN transistor 603. The collector of this transistor is coupled to the base of PNP transistor 606 by resistor 604, and resistor 605 limits the voltage between base and emitter of transistor 606 and also provides a bias. When the turn indicator switch is on in either position, the current drop in resistors 601 and 602 provides the voltage to turn on the transistor 603. The resulting current flow in resistor 604 develops the voltage drop required at the base of PNP transistor 606 to turn it on, and the full positive bias voltage minus the small transistor drop appears on the collector of transistor 606. This voltage is then switched by the contacts of switch pole S1 to the base circuit of the lamp driver that is to be turned off and the opposite lamp then functions as the flashing turn signal. The switch arm of switch pole S2' is returned to the circuit which is normally grounded by the reed switch designated 5, this switch being shown in dotted lines in FIG. 2. When this reed switch 5' closes and the turn switch is in an on position, the resistance in the base circuit of transistor 603 is switched to ground potential and the transistor 603 is inoperative. Likewise the current in resistor 604 is zero, except for any voltage that may be on the contact of the switch from the lamp drivers during the normal flashing sequence. Also, the bias on the lamp drivers is not supplied since transistor 606 is nonconducting. The warning system now has a priority over the turn signal indicator and will go into operation with the alternately flashing lamps regardless of the position of the turn signal switch, when the pendulum displacement closes the reed switch 5'.

The priority system according to the present invention thus resolves conflicts between the modes of operation involving warning of rapid deceleration and turn signal operation and also avoids compromise of the warning system in the event switch 500 becomes struck in a turn indicating state. Thus the priority system enhances the safety features of the warning system. In the foregoing arrangement, the priority system is placed in operation in response to a predetermined level of vehicle deceleration signalled by the closing of reed switch 5'.

Figure 3:
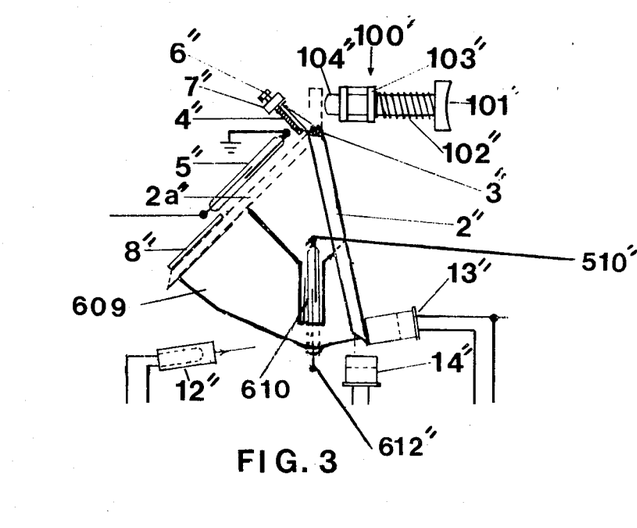
FIG. 3 is an elevational view of a priority scheme for the system of FIG. 1 according to another embodiment of the present invention.

An alternate means for providing operational priority for the system is illustrated in FIG. 3. For convenience in illustration, components similar to those of the system of FIG. 1 are identified by the same reference numeral with a double prime designation. A damping plate 609 of soft iron replaces plate 9 shown in FIG. 1, and the new plate 609 is slotted or notched to a width approximately one tenth of an inch wider than the diameter of a reed switch 610 shown in the open portion of the damping plate. This reed switch 610 is mounted just below the surface of the damping plate and adjusted so that the reed will close when the pendulum angle goes from vertical to approximately ten degrees, or in the area where the reed switch 5' is actuated by pendulum 2''. One side of switch 610 is connected to line 510'' leading to the source of 12 volts positive bias voltage, and the other side of reed switch 610 is connected by a line 612 to the arm of switch pole S1. When the plus bias voltage is placed on the lamp drivers by the action of this switch, i.e. the bias is placed on the drivers through the turn indicator switch section S1 when the read switch 610 is closed, the bias will appear and likewise when the pendulum exceeds the 10 degree angle the bias will be removed when the reed switch 610 is opened. Section S2 of the turn signal switch remaining on ground would be shunted by reed switch 5 with normal effect.

The resistor 47 which will be in the circuit is of sufficiently high value so that the oscillator frequency will not be greatly affected. Accordingly, the foregoing approach using the additional reed switch 610 would also provide operational priority for the warning system.

It is therefore apparent that the present invention accomplishes its intended objects. The vehicle warning system employs the visual indicators thereof as turn signals providing advantages of versatility and cost saving for the system. The warning system can include a priority arrangement for added safety whereby operation of the warning system has priority over the turn signals at predetermined levels of deceleration.

While several embodiments of the present invention have been described in detail, this is for the purpose of illustration, not limitation.

I claim:

1. In combination with an electronic acceleration or deceleration warning system for a vehicle comprising an electromechanical transducer for converting deceleration of the vehicle into an electrical quantity which changes in proportion to the vehicle rate of deceleration, an oscillator for generating a variable frequency output signal, means operatively connected to said transducer and to said oscillator for varying the frequency of said oscillator output signal in proportion to the vehicle rate of deceleration, first and second warning lamps located in horizontally spaced relation on at least one exterior end of the vehicle and operatively connected to said oscillator in a manner such that said lamps flash visibly at a rate determined by the vehicle rate of deceleration:
   (a) manually operated switch means having a first state manually selectable to indicate turning of the vehicle in one direction, a neutral state in which no turning is indicated, and a second state manually selectable to indicate turning of the vehicle in another direction; and
   (b) circuit means connected to said switch means and to said warning lamps and to said oscillator, said circuit means including means for causing said oscillator to apply a substantially constant frequency signal to said first warning lamp and means for preventing application of said oscillator signal to said second warning lamp when said switch is in said first state, and said circuit means further including means for causing said oscillator to apply a substantially constant frequency signal to said second warning lamp and means for preventing application of said oscillator signal to said first warning lamp when said switch is in said second state.

2. The combination according to claim 1, wherein said switch means comprises a three pole, double throw switch, one of said poles being a neutral pole having the contacts thereof connected to electrical ground, and wherein said circuit means comprises:
   (a) means for connecting both contacts of one of said switch poles to said means connected to said transducer and to said oscillator;
   (b) frequency determining resistance means connected between the arm of said one switch pole and said oscillator for causing said oscillator to provide a substantially constant frequency output signal;
   (c) means for connecting the arm of said neutral switch pole to said oscillator;
   (d) means for connecting the arm of the other of said switch poles to a source of direct voltage used in preventing application of said oscillator output signal to said warning lamps;
   (e) means for connecting one contact of said other switch pole to a drive circuit for said first warning lamp whereby when said arm engages said one contact said first warning lamp is rendered inoperative and the substantially constant frequency output signal of said oscillator is applied to said second warning lamp; and
   (f) means for connecting the other contact of said other switch pole to a driver circuit for said second warning lamp whereby when said arm engages said other contact said second warning lamp is rendered inoperative and the substantially constant frequency output signal of said oscillator is applied to said first warning lamp.

3. The combination according to claim 2, wherein each of said driver circuits for said warning lamps includes a transistor having base, collector and emitter terminals, each lamp being connected in the collector-emitter circuit of the corresponding transistor, and each transistor base terminal being connected to a corresponding one of said contacts of said other switch pole.

4. The combination according to claim 1, further including priority means operatively connected to said transducer and to said circuit means and operative in response to a predetermined level of deceleration to prevent disabling of either of said first and second warning lamps and allow said warning system to operate irregardless of the state of said switch means.

5. The combination according to claim 4, wherein said priority means comprises:
   (a) voltage controlled switching means connected in controlling relation to both of said means for preventing application of said oscillator signal to said first and second warning lamps, said voltage controlled switching means disabling either of said preventing means in response to a predetermined voltage applied thereto; and
   (b) means connected to said transducer means and to said voltage controlled switching means for developing said predetermined voltage for operating said switching means in response to said predetermined level of deceleration.

6. The combination according to claim 3, wherein said transducer means provides a predetermined voltage condition in response to a predetermined level of deceleration and further comprising voltage controlled switching means connected between said source of direct voltage and the arm of the other of switch poles, said voltage controlled switching means preventing application of said direct voltage for rendering said warning lamps inoperative thereby allowing said warning system to operate irregardless of the state of said switch means.

7. The combination according to claim 4, wherein said transducer comprises a pendulum mounted for movement in response to the degree of deceleration of said vehicle and wherein said priority means comprises switch means connected in controlling relation to both of said means for preventing application of said oscillator signal to said first and second warning lamps, said switch means being responsive to the degree of movement of said pendulum and operative to disable either of said preventing means in response to a predetermined degree of movement of said pendulum.

8. The combination according to claim 1 wherein said manually operated switch means and said circuit means are connected in a manner such that said oscillator is activated when not normally on in response to manual operation of said switch means and a voltage or current is derived therefrom and amplified by said circuit means for operating the appropriate one of said warning lamps for use as a turn signal and wherein the combination further includes priority means operatively connected to said transducer and to said circuit means for switching off said voltage or current to prevent the operation of said warning lamps as turn signals when said transducer means indicates a predetermined rate of deceleration of the vehicle.

* * * * *

UNITED STATES PATENT AND TRADEMARK OFFICE
CERTIFICATE OF CORRECTION

PATENT NO. : 4,384,269
DATED : May 17, 1983
INVENTOR(S) : Robert W. Carlson

It is certified that error appears in the above-identified patent and that said Letters Patent are hereby corrected as shown below:

In Claim 2, part e), line 2, change "drive" to --driver--.

Signed and Sealed this

Twenty-third Day of August 1983

[SEAL]

Attest:

GERALD J. MOSSINGHOFF

Attesting Officer   Commissioner of Patents and Trademarks